United States Patent
Okumura et al.

(10) Patent No.: US 6,741,527 B2
(45) Date of Patent: *May 25, 2004

(54) MAGNETO-OPTICAL RECORDING MEDIUM AND MAGNETO-OPTICAL RECORDING AND REPRODUCING DEVICE CAPABLE OF CONTROLLING REPRODUCTION POWER BASED ON LONG RECORDED MARKS

(75) Inventors: Tetsuya Okumura, Neyagawa (JP); Shigemi Maeda, Yamatokoriyama (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/557,483

(22) Filed: Apr. 24, 2000

(65) Prior Publication Data
US 2003/0035348 A1 Feb. 20, 2003

(30) Foreign Application Priority Data
Apr. 26, 1999 (JP) .......................... 11-117483

(51) Int. Cl.$^7$ .............................. G11B 11/00
(52) U.S. Cl. ................ 369/13.26; 369/13.54
(58) Field of Search .................. 369/13.27, 13.26, 369/13.24, 116, 47.5, 13.54, 47.51, 47.52, 47.53; 360/59

(56) References Cited

U.S. PATENT DOCUMENTS

| | | | | |
|---|---|---|---|---|
| 5,537,381 A | * | 7/1996 | Fuji | 389/116 |
| 5,617,400 A | | 4/1997 | Fuji | 369/116 |
| 5,633,838 A | | 5/1997 | Hirokane et al. | 369/13 |
| 5,732,049 A | | 3/1998 | Nishimura | 369/13 |
| 6,288,992 B1 | * | 9/2001 | Okumura et al. | 369/47.5 |

FOREIGN PATENT DOCUMENTS

| | | |
|---|---|---|
| JP | 07-073472 | 3/1995 |
| JP | 08-221821 | 8/1996 |
| JP | 10-241221 | 9/1998 |
| JP | 10-275335 | 10/1998 |
| JP | 11-39739 | 2/1999 |

* cited by examiner

*Primary Examiner*—Tan Dinh
(74) *Attorney, Agent, or Firm*—David G. Conlin; William J. Daley, Jr.; Edwards & Angell, LLP

(57) ABSTRACT

A magneto-optical disk recording and reproducing device, which carries out recording and reproducing for a magnetic super-resolution magneto-optical disk including a recording layer and reproducing layer, has a recording data processing circuit which records long recording marks at different positions between adjacent tracks in a radius direction, each of the long recording marks being larger in diameter than an aperture formed on the reproducing layer by projecting thereon the light beam. According to this arrangement, it is possible to continuously reproduce a data recording area with high accuracy and optimum reproducing power without being affected by adjacent tracks.

10 Claims, 13 Drawing Sheets

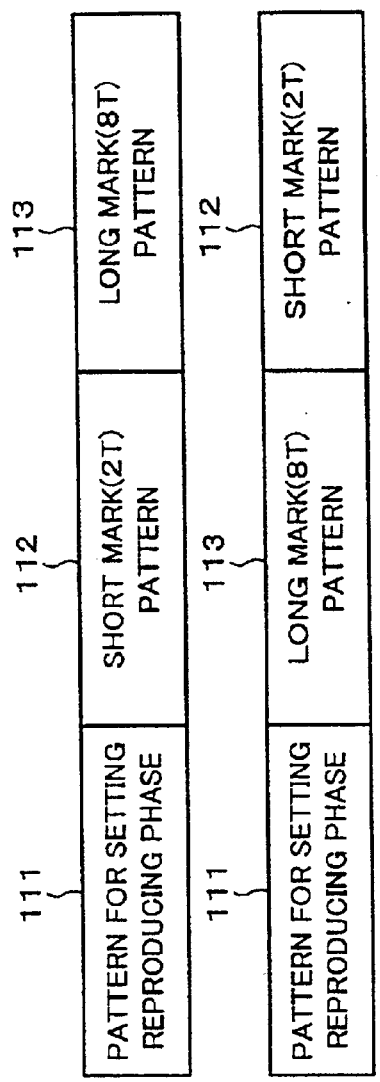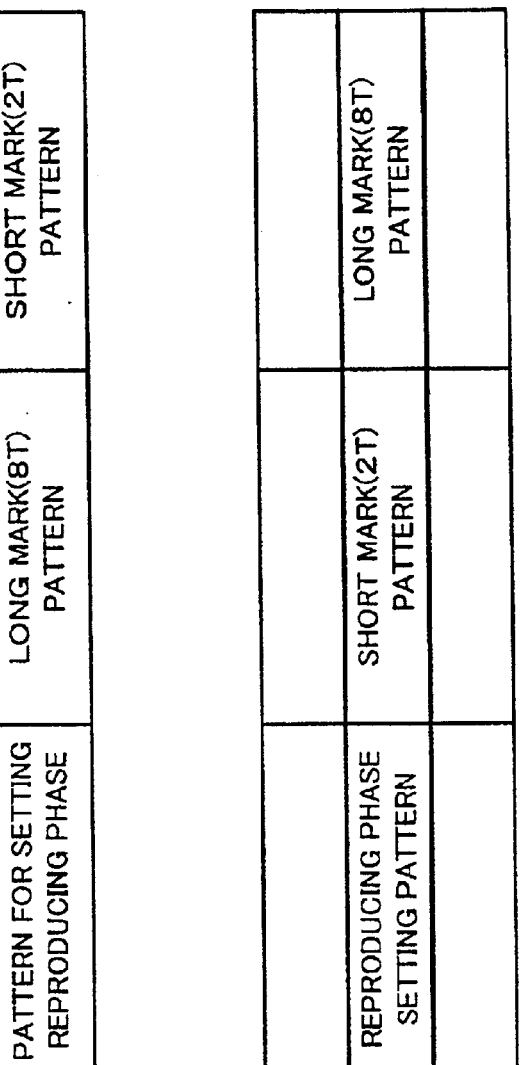

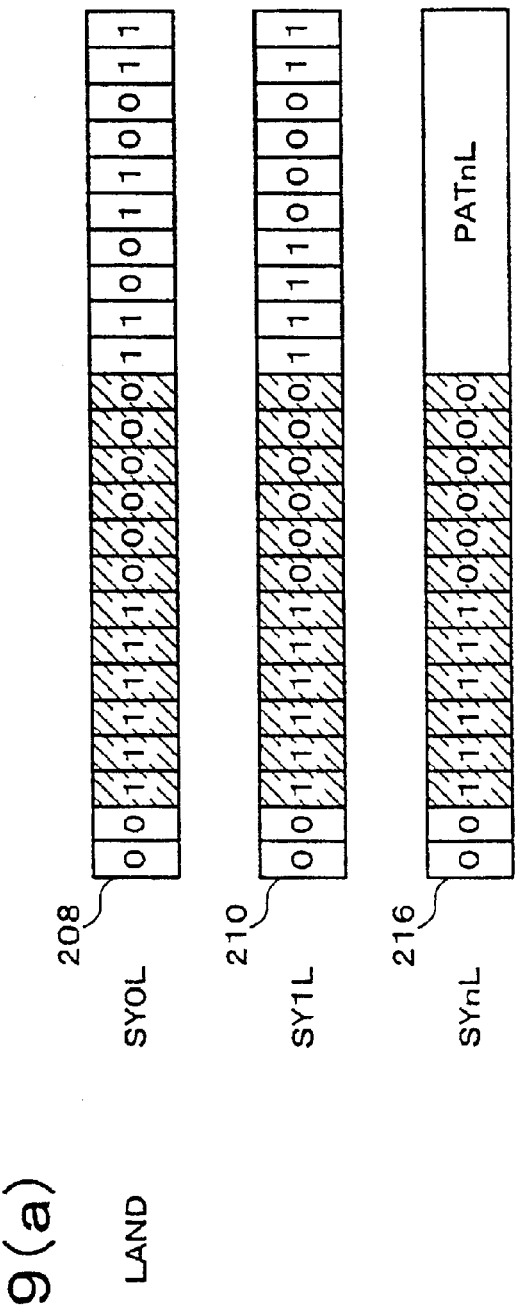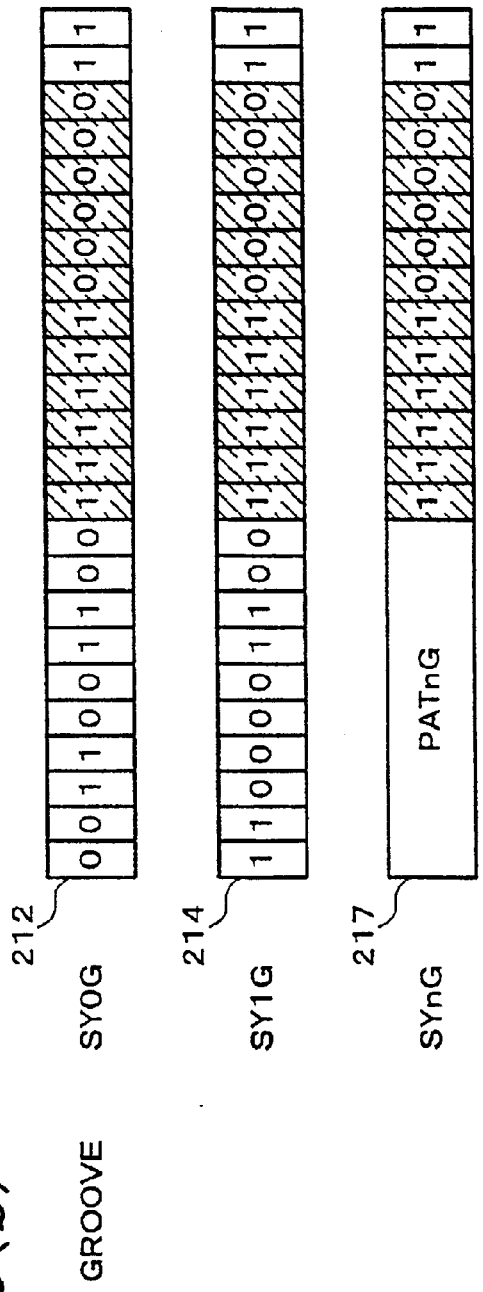
FIG. 9(a) LAND
FIG. 9(b) GROOVE

203 HEADER AREA

| PATTERN FOR SETTING REPRODUCING PHASE | SHORT MARK(2T) PATTERN |
|---|---|

- ◇ - 2T NO MARK RECORDED ON ADJACENT TARACKS
- □ - 8T NO MARK RECORDED ON ADJACENT TARACKS
- ▲ - 2T MARK RECORDED ON ADJACENT TARACKS
- ● - 8T MARK RECORDED ON ADJACENT TARACKS

- ◇ - 2T/8T NO MARK RECORDED ON ADJACENT TARACKS
- ■ - 2T/8T MARK RECORDED ON ADJACENT TARACKS

MAGNETO-OPTICAL RECORDING MEDIUM AND MAGNETO-OPTICAL RECORDING AND REPRODUCING DEVICE CAPABLE OF CONTROLLING REPRODUCTION POWER BASED ON LONG RECORDED MARKS

FIELD OF THE INVENTION

The present invention relates to a magneto-optical recording medium and a magneto-optical recording and reproducing device which use a magnetic super-resolution method.

BACKGROUND OF THE INVENTION

In magneto-optical disk devices which use the magnetic super-resolution method, a magneto-optical disk is used which is provided with a recording layer and with a reproducing layer having in-plane magnetization. In this type of magneto-optical disk device, during reproducing, a light beam is projected onto the reproducing layer side of the magneto-optical disk. Then, part of the area of the reproducing layer within the light beam spot is heated to above a predetermined temperature, and the magnetization of this portion (referred to as an aperture) shifts from in-plane magnetization to a perpendicular magnetization conforming to that of the recording layer beneath the aperture, i.e., the magnetization of the recording layer is copied to the reproducing layer. In this way, with this type of magneto-optical disk device, by reproducing the magnetization of the aperture, recorded marks smaller in diameter than the light beam spot can be reproduced.

In magneto-optical disk devices using this magnetic super-resolution method, it is preferable if the power of the light beam during reproduction (the reproducing power) is continuously at an optimum level. However, there are cases in which the optimum level of the reproducing power fluctuates with changes in the ambient temperature at the time of reproducing. For this reason, even if the current for driving the structure which produces the light beam (the driving current) is held constant, there are cases in which the reproducing power deviates from the optimum level.

If reproducing power is much stronger than the optimum level, the aperture formed on the magneto-optical disk becomes too large. Consequently, output of reproducing signals from tracks adjacent to the track being reproduced (crosstalk) is increased, the proportion of noise signals included in the reproduced data increases, and reading errors are more likely to occur.

Again, if reproducing power is much weaker than the optimum level, the aperture becomes smaller than the recorded mark, and the reproducing signal output from the target track is reduced. Accordingly, reading errors are more likely to occur in this case as well.

In a recording and reproducing device disclosed in Japanese Unexamined Patent Publication No. 63817/1996 (Tokukaihei 8-63817, published on Mar. 8, 1996) (U.S. Pat. No. 5,617,400), in order to control reproducing power, long marks and short marks formed on a magneto-optical disk are reproduced. These long and short marks are two types of recorded marks for reproducing power control of different mark lengths. In this device, reproducing power is controlled so as to bring close to a predetermined value a ratio of the quantities of the reproducing signals from these recorded marks. By this means, in this device, reproducing power is maintained at an optimum value, and the likelihood of reading errors is reduced.

FIG. 12 schematically shows a construction of a reproducing power control section in the recording and reproducing device of the above publication. Further, FIG. 13 is a schematic diagram showing a construction of a magneto-optical disk 30 used for the recording and reproducing device.

Prior to the explanation on the construction of the recording and reproducing device described in the publication, the construction of the magneto-optical disk 30 is firstly discussed. A track 320 is concentrically formed in the magneto-optical disk 30. A plurality of sectors 300 are successively formed in the track 320. As shown in FIG. 13, an address area 301, a reproducing power control area 302, and a data recording area 303 are formed in each of the sectors 300. The address area 301 is provided for recording information about a position of the sector. The reproducing power control area 302 is provided for recording a pattern of repeated short marks and a pattern of repeated long marks as recording marks for controlling reproducing power. The data recording area 303 is provided for recording digital data.

Here, the long mark is a mark having a larger diameter than the aperture, and the short mark is a mark having a shorter diameter than the aperture.

Next, referring to FIG. 12, the following explanation describes a reproducing operation in the recording and reproducing device. Firstly, when a light beam emitted from a semiconductor laser 32 reaches the address area 301 of the sector 300 on the magneto-optical disk 30, a sector address is recognized. And then, the emitted light is projected onto the reproducing power control area 302. Next, the light is reflected from a pattern of repeated long marks and short marks that is recorded in the area 302, and the light is converted to a reproducing signal by a photo-diode 33. The reproducing signal is inputted to an amplitude ratio detecting circuit 34. And an amplitude ratio detected in the amplitude ratio detecting circuit 34 is compared with a standard amplitude ratio by a differential amplifier 35, feedback is performed in a direction reducing a difference of the ratios, and a laser power control circuit 36 controls a driving current of the semiconductor laser 32.

After a driving current of a laser beam is controlled in such a manner so as to provide optimum reproducing power, the emitted light is projected to the area 303, the reproducing signal which has been read is inputted to a reproducing data processing circuit 37, and the likelihood of reading errors is reduced.

And then, when the emitted light reaches the next sector, the same operation is repeated so as to reset the optimum reproducing power.

In this way, the recording area of recording marks for controlling reproducing power is provided for each sector, and the quantity of reproducing signals for controlling reproducing power is detected for each sector, so that the reproducing power control can provide a response with a short time interval and correspond to short-time fluctuation of the optimum reproducing power.

However, the above magneto-optical reproducing method using the magnetic super-resolution method is more likely to be affected by a magnetic field from the outside because a signal is read based on a magnetic field stored in the recording medium and a temperature increase caused by radiation of a light beam. Namely, even when a length of the recording mark and the reproducing power remain the same, an amplitude of a signal may be changed according to the intensity of the external magnetic field.

The intensity of the external magnetic field varies due to leak of a magnetic field and others from an actuator of an optical head, and the intensity is also affected by a magnetic field from a recording mark recorded around a recording mark to be reproduced.

The intensity of the magnetic field from the surrounding recording mark depends upon a relationship between the recording mark to be reproduced and the surrounding recording mark with respect to size and polarity. Therefore, in the magneto-optical reproduction using the magnetic super-resolution method, an amplitude value of a reproducing signal may be varied depending upon a kind of recording mark recorded in adjacent tracks.

FIG. 14 is a graph showing measurement results of amplitude values regarding long and short marks (2T pattern and 8T pattern) relative to a change in reproducing power with respect to the following cases: when no recording mark is recorded in adjacent tracks of a track to be reproduced, and when a recording mark is recorded in the adjacent tracks with the same length as a recording mark belonging to a track to be reproduced. Here, a horizontal axis represents a reproduction power and a vertical axis represents an amplitude value (PEAK TO PEAK value).

According to the results, it is understood that when short marks are adjacent to each other, an amplitude value is hardly affected by the presence or absence of recording marks in adjacent tracks, and when long marks are adjacent to each other, an amplitude value sharply declines.

Further, FIG. 15 is a graph showing amplitude ratios of long and short marks (2T amplitude value/8T amplitude value) relative to a change in reproducing power regarding the following cases: when short marks are adjacent to each other, and when long marks are adjacent to each other. These ratios are obtained based on the measurement results of FIG. 14. A horizontal axis represents reproducing power and a vertical axis represents an amplitude ratio.

According to these results, when long marks are adjacent to each other, an amplitude ratio is considerably varied as compared to the case when no recording mark is recorded in the adjacent tracks of a track to be reproduced. This is because long marks being adjacent to each other result in a change in an external magnetic field of a reproducing layer in the magneto-optical disk, thereby changing an aperture diameter.

Therefore, regarding the same standard amplitude ratio, as compared with the case when no recording mark is recorded in tracks being adjacent to a track to be reproduced, when performing control in a state in which recording marks are recorded in the adjacent tracks, the control is exercised by larger reproducing power. As shown in the graph of FIG. 15, when no recording mark is recorded in the adjacent tracks at the target amplitude ratio of 0.5, the reproducing power is 2.4 mW, and when recording marks are recorded in the adjacent tracks, the reproducing power is 2.5 mW.

Namely, when an amplitude ratio is set such that a reproducing signal has an optimum signal quality, with reference to a state in which no recording mark is recorded in tracks being adjacent to a track to be reproduced, even if an amplitude ratio is set at the standard amplitude ratio, that is determined according to the above reference, reproducing power may be shifted from optimum reproducing power.

SUMMARY OF THE INVENTION

An objective of the present invention is to provide a magnetic super-resolution method magneto-optical recording medium and magneto-optical recording and reproducing device, that can reproduce a data recording area with high accuracy and optimum reproducing power without being affected by adjacent tracks.

In order to achieve the above objective, the magnetic super-resolution magneto-optical recording medium including a recording layer and a reproducing layer, is characterized in that recording marks for controlling reproducing power of a light beam are recorded at different positions between adjacent tracks in a radius direction, the recording mark being longer than a diameter of an aperture, which is formed on the reproducing layer by projecting thereon the light beam.

Like the conventional art, when long marks for controlling reproducing power of a light beam are adjacent to each other (formed at the same position between the adjacent tracks in a radius direction), an external magnetic field is varied on the reproducing layer of the magneto-optical disk during reproduction of information, so that an aperture diameter is likely to change. Therefore, when an amplitude ratio is determined so as to obtain an optimum reproducing signal with reference to a state in which no recording mark is recorded in tracks adjacent to the track being reproduced, in a state in which a recording mark is recorded in the adjacent tracks, even if an amplitude ratio is set at the standard amplitude ratio determined in accordance with the above reference, reproducing power is shifted from the actual optimum reproducing power. Hence, as described above, the present invention has a construction in which long recording marks for controlling reproducing power are formed at different positions between the adjacent tracks in a radius direction, so that it is possible to continuously reproduce a data recording area with high accuracy and optimum reproducing power without being affected by the adjacent tracks.

With the above arrangement, in the magneto-optical recording medium of the present invention, a resync pattern is preferably formed in a data recording area of a sector constituting the magneto-optical recording medium, and the recording mark is preferably recorded in the resync pattern.

Moreover, it is desirable that only a pattern for setting reproducing phase, that adjusts a phase of a reproducing clock, and short recording marks for controlling reproducing power, each of the short recording marks being smaller in diameter than the aperture, be recorded in a header area of the sector.

This arrangement makes it possible to reduce the header area of the sector and to achieve more efficient use of the magneto-optical recording medium.

Further, in order to achieve the aforementioned objective, the magneto-optical recording and reproducing device of the present invention, which carries out recording and reproducing for a magnetic super-resolution magneto-optical recording medium including the recording layer and the reproducing layer, is characterized by including a recording means which records long recording marks for controlling reproducing power of a light beam at different positions between adjacent tracks in a radius direction, each of the long recording marks being larger in diameter than an aperture formed on the reproducing layer by projecting thereon a light beam.

According to this arrangement, long recording marks for controlling reproducing power are recorded at different positions between adjacent tracks in a radius direction. Thus, it is possible to continuously reproduce the data recording area with high accuracy and optimum reproducing power without being affected by the adjacent tracks.

With this arrangement, in the magneto-optical recording and reproducing device of the present invention, it is desirable that the recording means further include a pattern generating means for generating different recording mark patterns (header pattern and resync pattern) between adjacent tracks.

The specific area is, for example, a resync pattern of a header area or a data recording area in a sector, which constitutes the magneto-optical recording medium.

The present invention is applicable to the construction for recording both a land track and a groove track of the magneto-optical recording medium. In such a construction, it is preferable to include a means for generating a recording mark pattern for a land track and a recording mark pattern for a groove track, wherein a record mark pattern corresponding to a track is recorded in each specific area such that the specific areas of the magneto-optical recording medium are aligned between the adjacent tracks in a radius direction.

For a fuller understanding of the nature and advantages of the invention, reference should be made to the ensuing detailed description taken in conjunction with the accompanying drawings.

BRIEF DESCRIPTION OF THE DRAWINGS

FIG. 3(a) is an explanatory drawing showing a header pattern for a land that is generated by a header pattern generating circuit of the magneto-optical disk recording and reproducing device.

FIG. 3(b) is an explanatory drawing showing a header pattern for a groove that is generated by the header pattern generating circuit of the magneto-optical disk recording and reproducing device.

FIGS. 4(a) and 4(b) are explanatory drawings showing a state of recording in a header area.

FIG. 9(a) is an explanatory drawing showing a resync pattern for a land that is generated by a resync pattern generating circuit of the magneto-optical disk recording and reproducing device.

FIG. 9(b) is an explanatory drawing showing a resync pattern for a groove that is generated by a resync pattern generating circuit of the magneto-optical disk recording and reproducing device.

DESCRIPTION OF THE EMBODIMENTS

[Embodiment 1]

Referring to FIGS. 1 to 6, the following explanation describes one embodiment of the present invention.

Figure 1:
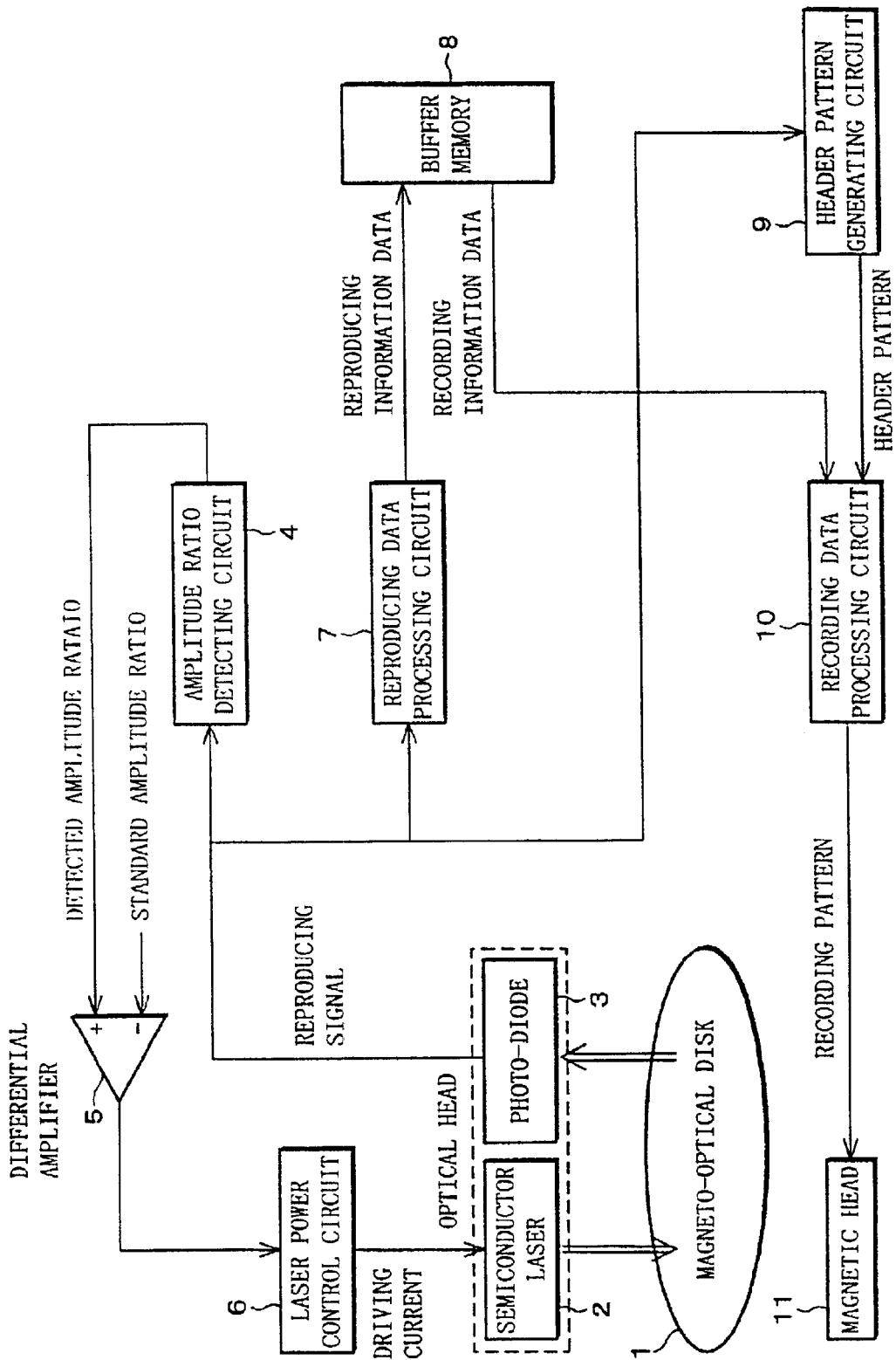
FIG. 1 is an explanatory view schematically showing the structure of a magneto-optical disk recording and reproducing device using a magnetic super-resolution method according to one embodiment of the present invention.
Figure 2A:
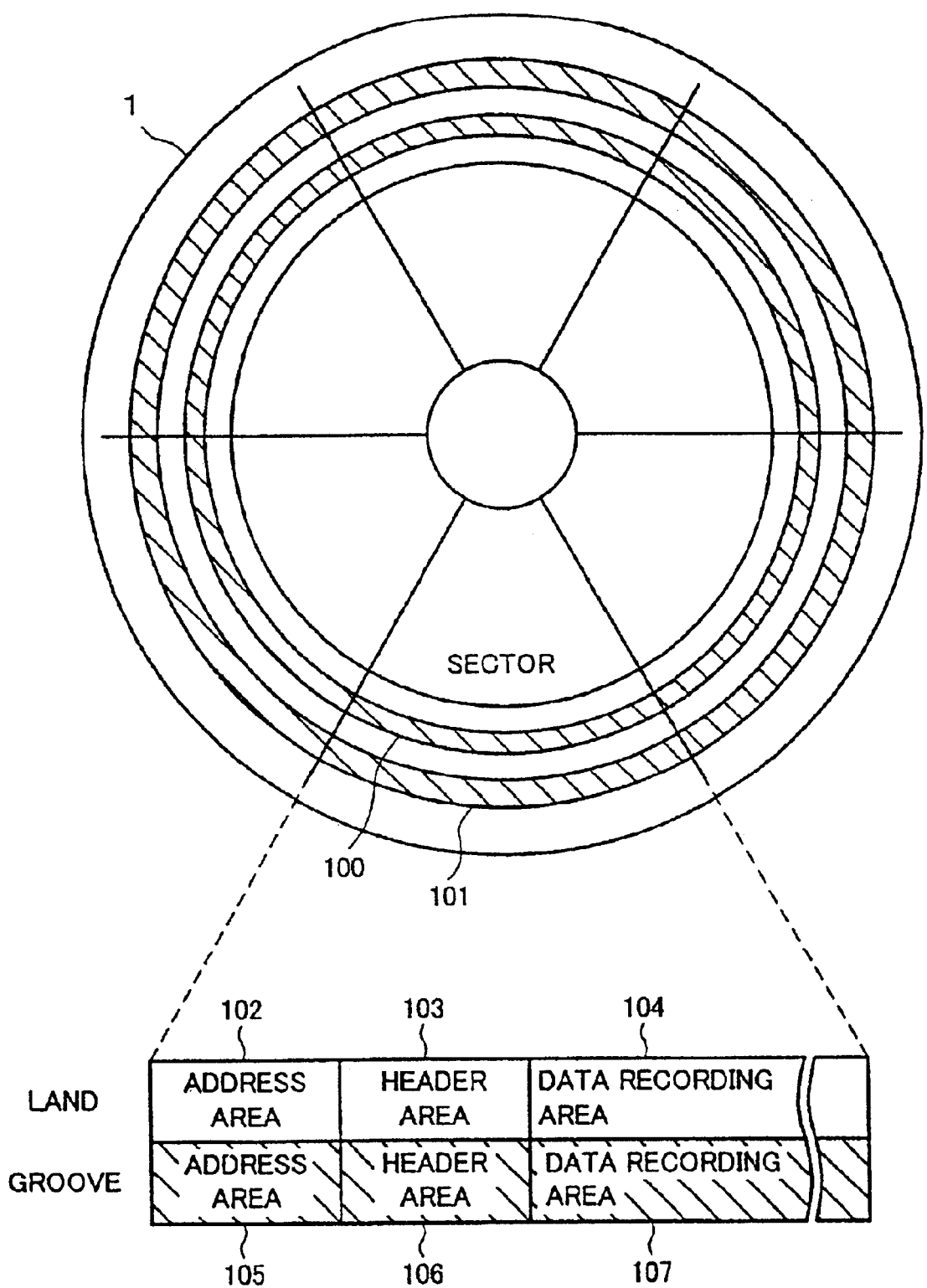
FIG. 2A is a diagram showing the construction of a magneto-optical disk used for the magneto-optical disk recording and reproducing device.

FIG. 1 is a schematic drawing showing a magneto-optical disk recording and reproducing device using a magnetic super-resolution method according to the present embodiment. FIG. 2A is a diagram showing the construction of a magneto-optical disk shown in FIG. 1.

Firstly, the magneto-optical disk of the present embodiment is discussed. The magneto-optical disk is a disk using a land groove recording method for recording data both in a land track and a groove track.

As shown in FIG. 2A, sectors 100 and 101 constitute the magneto-optical disk of the present embodiment, each being provided with address areas 102 and 105, header areas 103 and 106, and data recording areas 104 and 107. The address areas 102 and 105 are provided for recording address information of the sectors, that includes whether the sector is positioned on the land or the groove. The header areas 103 and 106 are provided for recording a pattern of repeated short marks and a pattern of repeated long marks as recording marks for controlling reproducing power, in addition to a pattern for setting reproducing phase composed of a pattern of repeated single marks for adjusting a phase of a reproducing clock. The data recording areas 104 and 107 are provided for recording digital data.

Figure 2B:
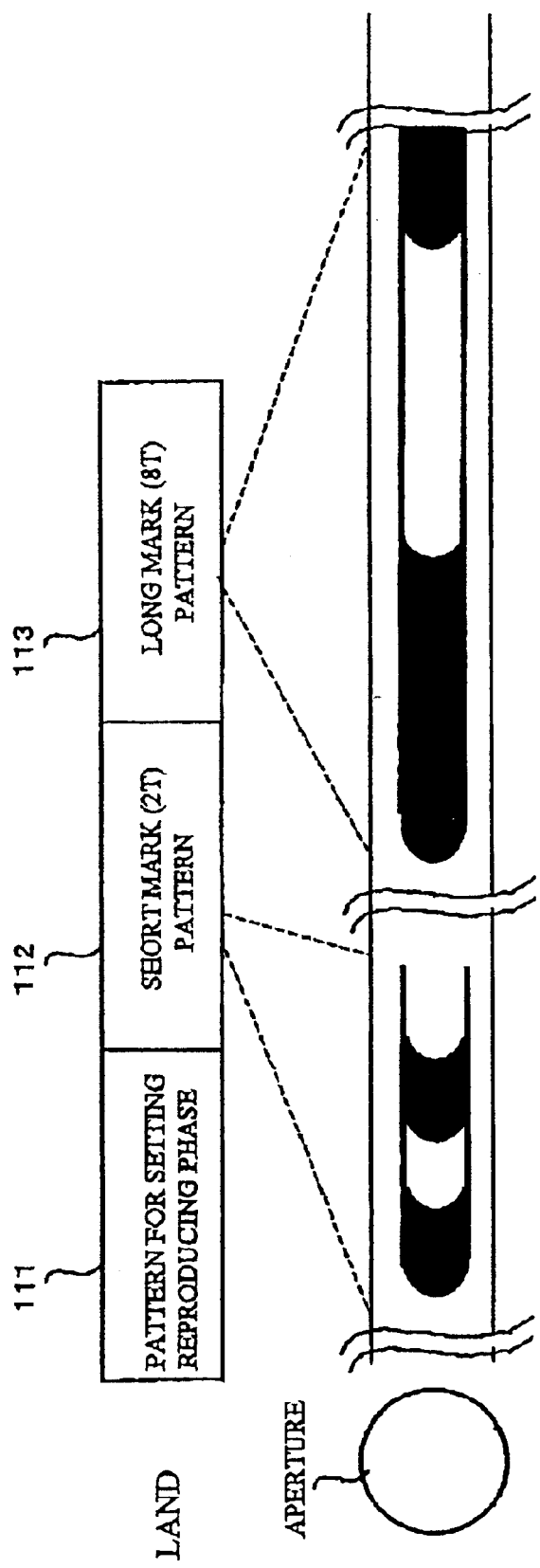
FIG. 2B is an explanatory drawing showing short marks and long marks formed in the magneto-optical disk of FIG. 2A.

Here, the long mark is a mark having a larger diameter than an aperture, and the short mark is a mark having a smaller diameter than the aperture, FIG. 2B. Further, the sectors 100 and 101 are aligned in a radius direction.

Next, the magneto-optical disk recording and reproducing device of the present embodiment is discussed. As shown in FIG. 1, the magneto-optical disk recording and reproducing device is provided with a semiconductor laser 2, a photodiode 3, an amplitude ratio detecting circuit 4, a differential amplifier 5, a laser power control circuit 6, and a reproducing data processing circuit 7, in the same manner as the conventional device. The magneto-optical disk recording and reproducing device of the present embodiment is provided with a buffer memory 8, a header pattern generating circuit 9, a recording data processing circuit 10, and a magnetic head 11, in addition to the conventional construction. The recording data processing circuit 10 switches recording information data from the buffer memory 8 and a header pattern generated in the header pattern generating circuit 9, and outputs a recording pattern. The magnetic head 11 generates a magnetic field corresponding to the recording pattern.

Next, a header pattern generated by the header pattern generating circuit 9 is discussed. FIG. 3(a) shows a header pattern for a land, and FIG. 3(b) shows a header pattern for a groove.

At the head, each of the header patterns includes a pattern for setting reproducing phase 111, which is constituted by a pattern of repeated single marks for adjusting a phase of a reproducing clock.

As shown in FIG. 3(a), in the pattern for a land, a pattern of repeated 2T marks is added as a short mark pattern 112 at the back of the pattern for setting reproducing phase 111, and a pattern of repeated 8T marks is added as a long mark pattern 113 at the back of the short mark pattern 112.

Meanwhile, in the pattern for a groove, as shown in FIG. 3(b), the long mark pattern 113 and the short mark pattern 112 are added in an opposite order at the back of the pattern for setting reproducing phase 111.

The header pattern generating circuit 9 recognizes whether the current track is a land track or a groove track based on the address information recorded in the address areas 102 and 105 of the sector, and switches and outputs the two patterns.

Next, a recording operation regarding the magneto-optical disk recording and reproducing device of the present embodiment is discussed in detail.

When light emitted from the semiconductor laser 2 reaches the addresses 102 and 105 of the sectors 100 and 101 on the magneto-optical disk 1, address information is recognized, and the sectors are confirmed as sectors to be recorded based on the address information, the laser power control circuit 6 emits a laser beam from the semiconductor laser 2 with a high power for recording so as to start the recording of the sectors 100 and 101.

Next, the header pattern generating circuit 9 recognizes if the sectors 100 and 101 to be recorded are positioned on the land or the groove based on the address information, and outputs a corresponding header pattern. The recording data processing circuit 10 drives the magnetic head 11 and records the header pattern based on the header pattern inputted from the header pattern generating circuit 9 while the semiconductor laser 2 emits light on the header areas 103 and 106 of the sectors 100 and 101. On the magneto-optical disk 1, the sector 100 of the land is aligned to the sector 101 of the groove in a radius direction, so that a header pattern recorded in the header area 103 of the land is aligned to a header pattern recorded in the header area 106 of the groove in a radius direction. Meanwhile, the recording data processing circuit 10 drives the magnetic head 11 and records data based on the recording information data inputted from the buffer memory 8.

FIGS. 4(a) and 4(b) show the header area 103 of the sector on the land, that is recorded in the above recording process, and the header areas 106 of the sector on the grooves being adjacent to the sector to be recorded. FIG. 4(a) shows that no sector is recorded in the grooves being adjacent to the sector to be recorded, and FIG. 4(b) shows that the sector is recorded in the adjacent grooves.

As shown in FIG. 4(b), when the sector is recorded in the tracks being adjacent to the sector to be recorded, the long mark pattern 113 is recorded in a part being adjacent to a part in which the short mark pattern 112 is recorded, and the short mark pattern 112 is recorded in a part being adjacent to a part in which the long mark pattern 113 is recorded. Namely, in the construction of the present embodiment, long marks for controlling reproducing power of a light beam are recorded in different parts between the adjacent tracks in a radius direction.

Figure 5:
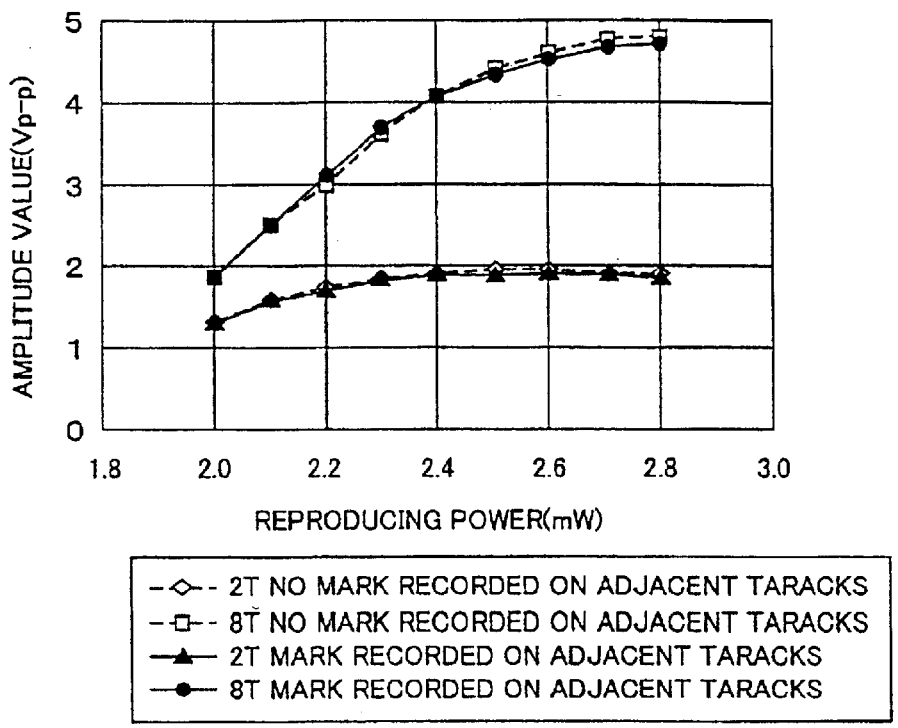
FIG. 5 is a graph showing measurement results of amplitude values regarding a long mark and a short mark relative to a change in reproducing power.

FIG. 5 is a graph showing measurement results regarding amplitude values of long marks and short marks (2T pattern and 8T pattern) relative to a change in reproducing power, with respect to a sector recorded in a state of FIG. 4(a), in which the sector is not recorded in the adjacent grooves, and a sector recorded in a state of FIG. 4(b), in which the sector is recorded in the adjacent grooves. In the graph, a horizontal axis represents reproduction power, and a vertical axis represents an amplitude value (PEACK-TO-PEAK value). According to the results, a difference is hardly caused by the presence or absence of records in the adjacent tracks, regarding short marks and long marks in the construction of the present embodiment. In view of electromagnetism, this is because the more inverting times of a magnetic polarity per unit area, the stronger a magnetic field.

Figure 6:
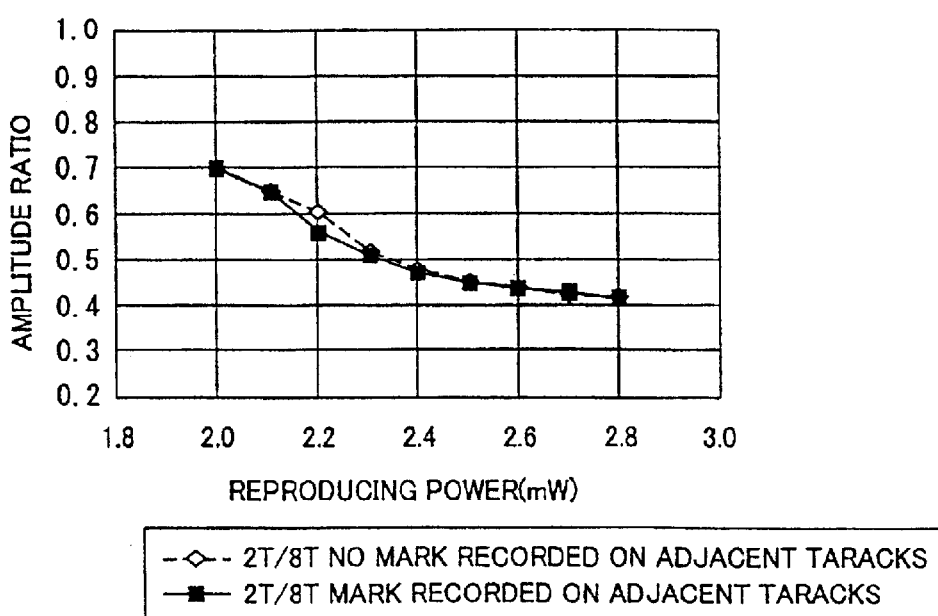
FIG. 6 is a graph showing measurement results of amplitude ratios regarding a long mark and a short mark relative to a change in reproducing power.

Further, FIG. 6 shows amplitude ratios of long marks and short marks (2T amplitude value/8T amplitude value) relative to a change in reproducing power regarding the aforementioned two cases. These results are obtained based on those of FIG. 5. A horizontal axis represents reproducing power and a vertical axis represents an amplitude ratio. According to the results, the amplitude ratios are hardly affected by the presence or absence of sectors in the adjacent tracks. As described above, according to the arrangement of the present embodiment, an amplitude ratio detected from the header area is not affected by the presence or absence of records in the adjacent tracks; consequently, regarding a sector recorded in the above-mentioned arrangement, it is possible to continuously reproduce a data area with high accuracy and optimum reproducing power by using the same reproducing method as the conventional art.

Here, although the magneto-optical recording disk, in which all the sectors are aligned in a radius direction, is taken as an example, it is merely necessary to align the header areas in a radius direction.

[Embodiment 2]

Referring to FIGS. 7 to 11(b), the following explanation describes another embodiment of the present invention. Here, those members (construction) that have the same functions and that are described in Embodiment 1 are indicated by the same reference numerals and the description thereof is omitted.

Figure 7:
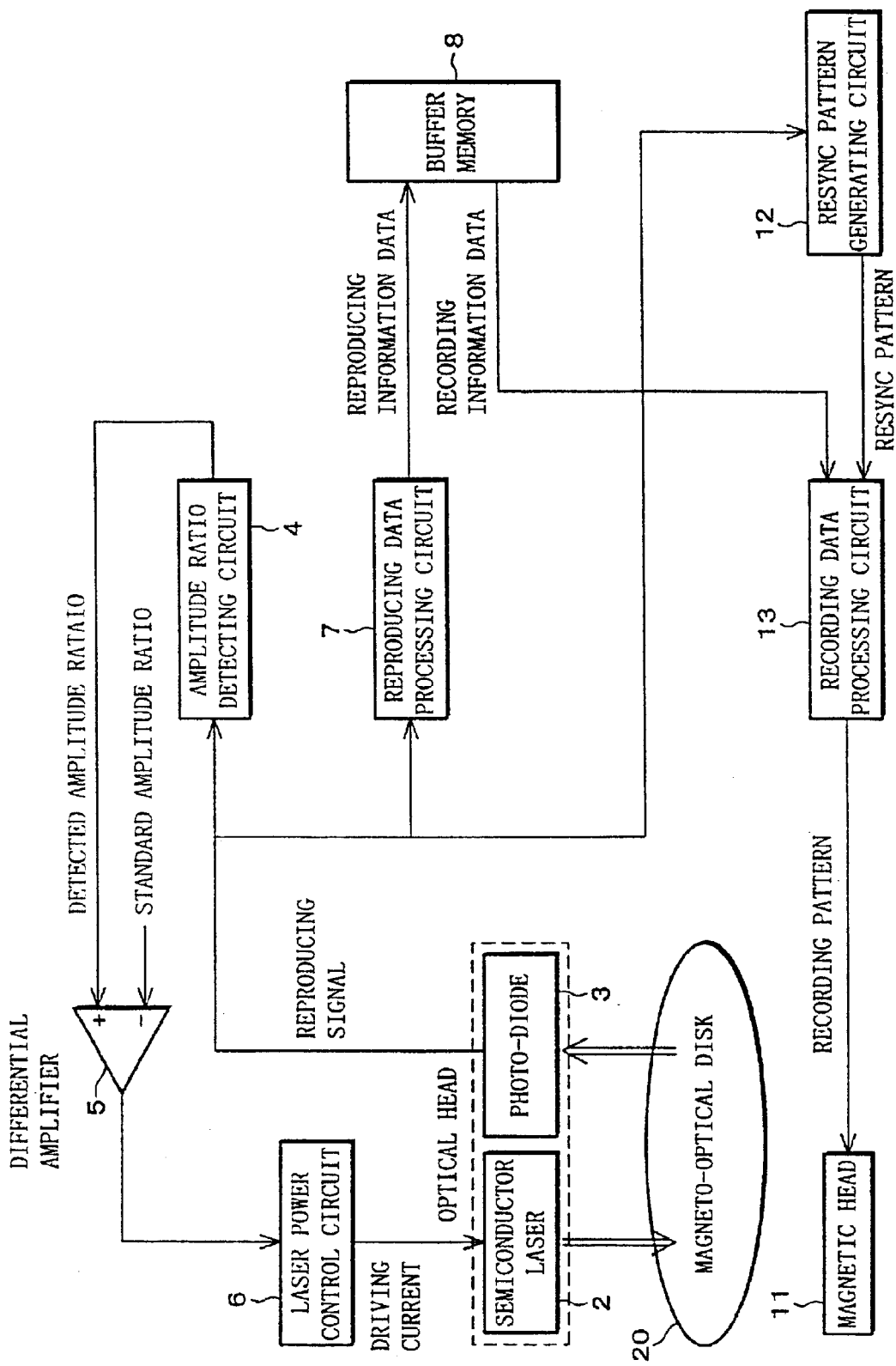
FIG. 7 is an explanatory view schematically showing the structure of a magneto-optical disk recording and reproducing device using a magnetic super-resolution method according to another embodiment of the present invention.
Figure 8:
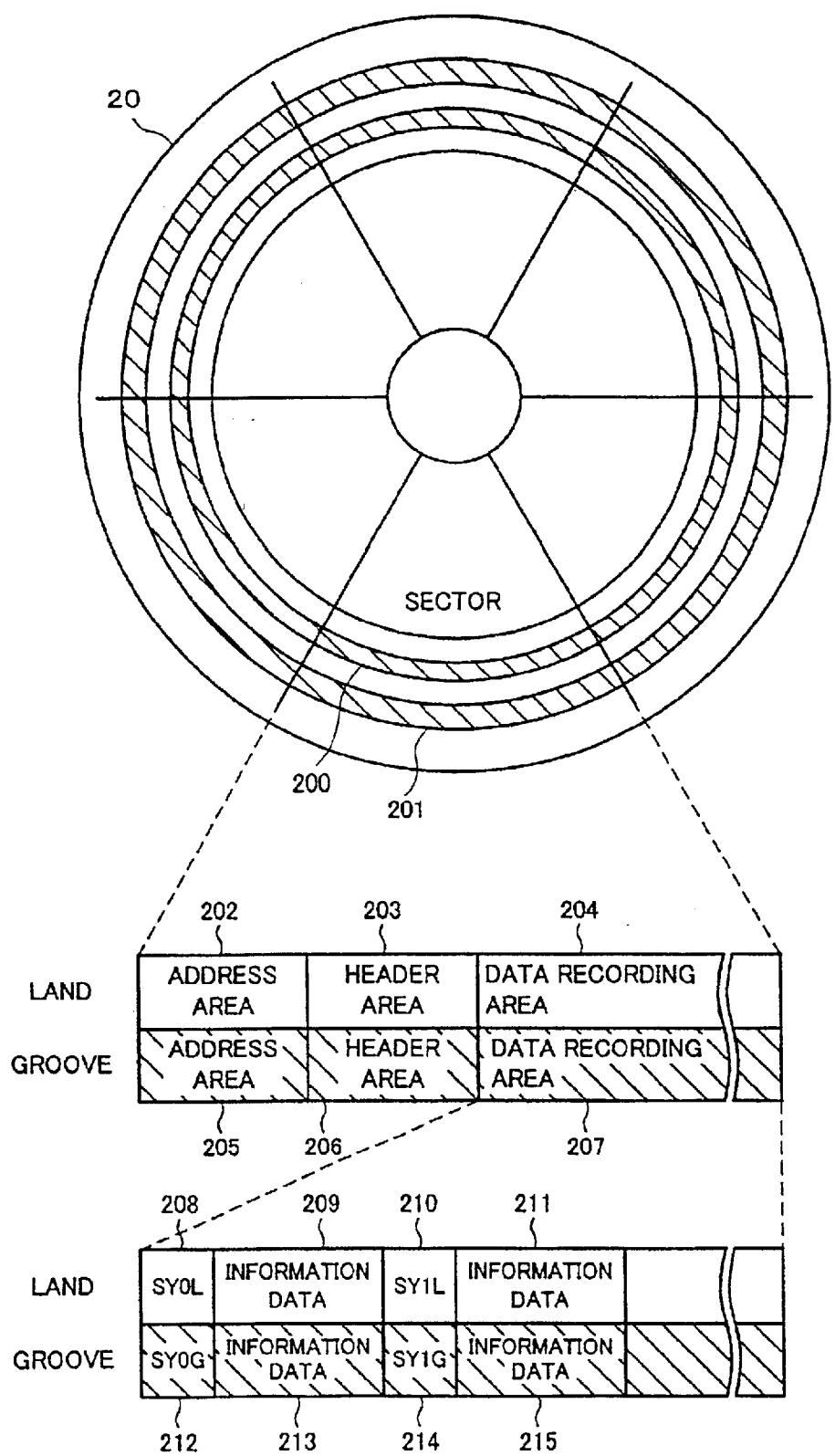
FIG. 8 is a diagram showing the construction of a magneto-optical disk used for the magneto-optical disk recording and reproducing device.

FIG. 7 is a schematic drawing showing a magneto-optical disk recording and reproducing device using a magnetic super-resolution method according to the present embodiment. FIG. 8 is a diagram showing a construction of the magneto-optical disk shown in FIG. 7.

Firstly, the magneto-optical disk of the present embodiment is discussed. The magneto-optical disk is a disk using a land groove recording method for recording data both in a land track and a groove track in the same manner as Embodiment 1.

As shown in FIG. 8, sectors 200 and 201 constitute the magneto-optical disk of the present embodiment, respectively being provided with address areas 202 and 205, header areas 203 and 206, and data recording areas 204 and 207. The address areas 202 and 205 record information about a position of the sector, that includes whether the sector is positioned on the land or the groove. The data recording areas 204 and 207 record digital data. Further, in this arrangement, the sectors 200 and 201 are aligned in a radius direction.

Moreover, each of the data recording areas 204 and 207 of the sectors 200 and 201 is constituted by information data divided into a plurality of segments of 209, 211, 213, and 215, and resyncs (SY0L208, SY1L210, . . . , SY0G212, SY1G212, . . . ) inserted between the divided information data.

The resync is used for re-synchronization upon reproducing data and is inserted for each information data having an appropriate length so as to prevent a bit shift appearing during reproduction from propagating over the sector. Here, the resyncs are respectively formed into characteristic patterns. In this way, the resync mark is formed for every fixed data bites so as to serve as a re-synchronization segment as well; thus, even in the event of a bit shift during reproduction, an error caused by the bit shift is contained in the resync mark so as to prevent the error from affecting data after the resync mark.

Next, the magneto-optical disk recording and reproducing device of the present embodiment is discussed. As shown in FIG. 7, the magneto-optical disk recording and reproducing device is provided with a semiconductor laser 2, a photo-diode 3, an amplitude ratio detecting circuit 4, a differential amplifier 5, a laser power control circuit 6, and a reproducing data processing circuit 7, in the same manner as Embodiment 1. The magneto-optical disk recording and reproducing device of the present embodiment is provided with a buffer memory 8, a resync pattern generating circuit 12 for generating a resync pattern, a recording data processing circuit 13, and a magnetic head 11, in addition to the conventional construction. The recording data processing circuit 13 switches recording information data from the buffer memory 8 and a resync pattern generated in the resync pattern generating circuit 12, and outputs a recording pattern. The magnetic head 11 generates a magnetic field corresponding to the recording pattern.

Referring to FIGS. 9(a) and 9(b), the following explanation describes a resync pattern generated by the resync pattern generating circuit 12.

FIG. 9(a) shows resync patterns for a land (SY0L208, SY1L210, SYnL216), and FIG. 9(b) shows resync patterns for a groove (SY0L212, SY1L214, SYnL217).

Both of them include 6T of one period (12 bits) serving as a long mark pattern for controlling reproducing power, and distinguishable characteristic patterns (PATnL, PATnG) mainly composed of short marks of 2T to 4T so as to allow each of the resync patterns to be characteristic, so that the resync pattern has 24 bits in total. The long mark pattern is positioned from the third bit to the fourteenth bit in the land resync pattern, and is positioned from the eleventh bit to the twenty second bit in the groove resync pattern.

The resync pattern generating circuit 12 recognizes if the current track is a land track or a groove track, based on address information of the sector, and switches the two kinds of patterns to be output. Additionally, the long mark required for controlling reproducing power only needs to be larger than an aperture diameter; thus, in this case, a mark of 6T is used as the long mark instead of a mark of 8T.

Figure 10:
FIG. 10 is an explanatory drawing showing a state of recording in a header area.

As described above, the resync pattern includes the long mark pattern for controlling reproducing power, so that the header area 203 of FIG. 10 is only constituted by a pattern for setting reproducing phase that is used for adjusting a phase of a reproducing clock, and a short mark (2T) pattern for controlling reproducing power. Hence, the header area is shortened and more efficient use of the disk is achieved.

Next, a recording operation regarding the magneto-optical disk recording and reproducing device of the present embodiment is discussed in detail.

When light emitted from the semiconductor laser 2 reaches the addresses 202 and 205 of the sectors 200 and 201 on the magneto-optical disk 20, address information is recognized, and the sectors are confirmed as sectors to be recorded based on the address information, the laser power control circuit 6 emits a laser beam from the semiconductor laser 2 with a high power for recording so as to start the recording of the sectors 200 and 201.

The resync pattern generating circuit 12 recognizes if the sectors 200 and 201 are positioned on a land or a groove, based on address information, and outputs a corresponding resync pattern.

When the semiconductor laser 2 emits light on the header areas 203 and 206 of the sectors 200 and 201, the recording data processing circuit 13 divides recording information data inputted from the buffer memory 8, into fixed lengths and records information data while inserting resync patterns inputted from the resync pattern generating circuit 12 between the divided information data. On the magneto-optical disk 20, the sector 200 on a land is aligned to the sector 201 on a groove in a radius direction, and the resync patterns are inserted into the data recording area with fixed intervals; thus, the resync patterns 208, 210, . . . , that are recorded in the data recording area 204 of a land, are respectively aligned to the resync patterns 212, 214, . . . , that are recorded in the data recording area 207 of a groove, in a radius direction.

Figure 11A:
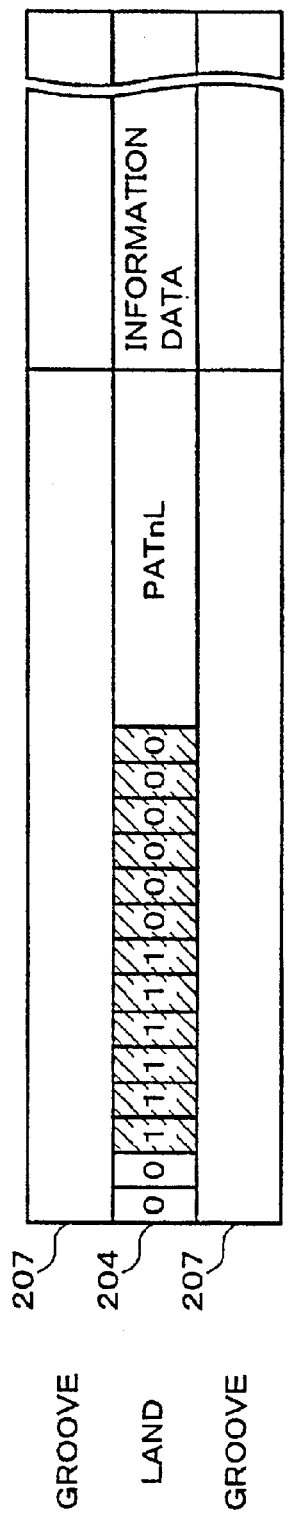
FIGS. 11(a) and 11(b) are explanatory drawings showing a state of recording in a data recording area.
Figure 11B:
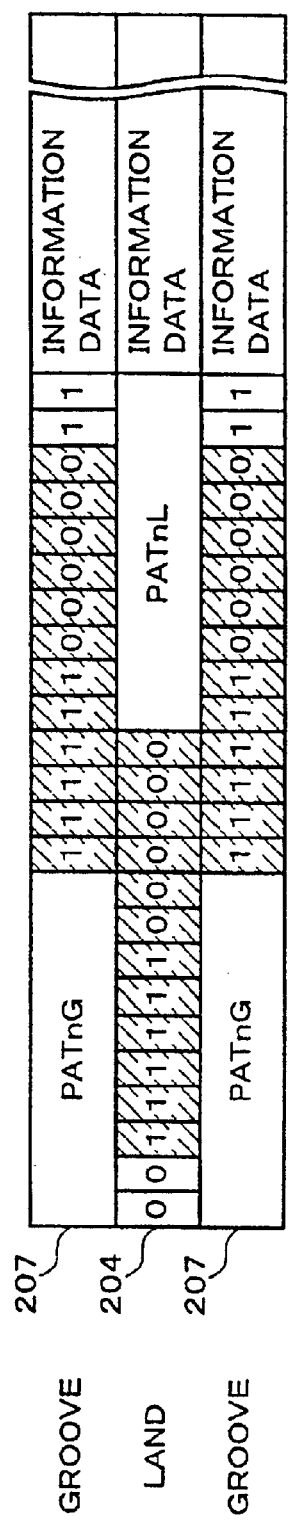
Figure 12:
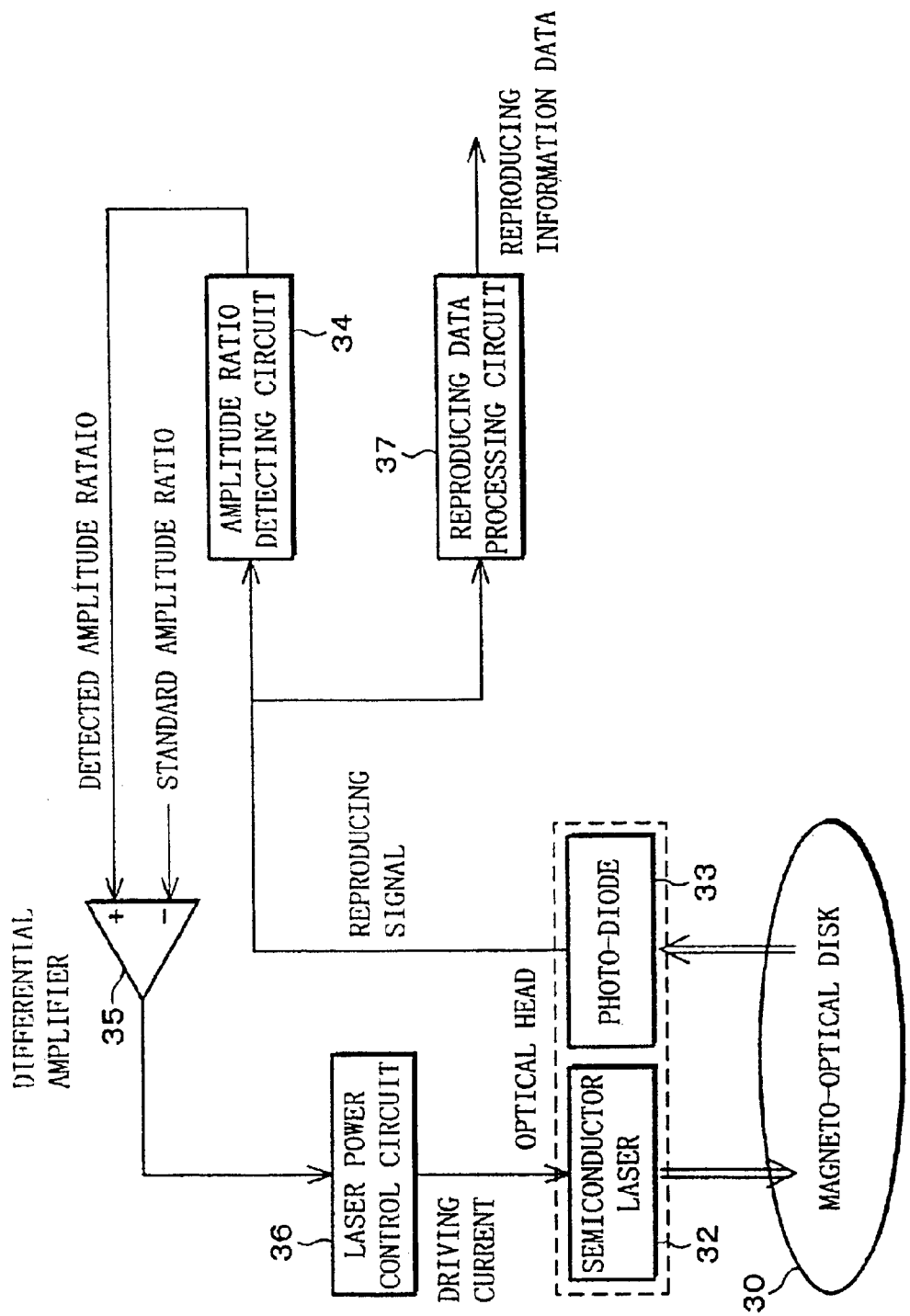
FIG. 12 is a schematic drawing showing a conventional magneto-optical disk reproducing device using a magnetic super-resolution method.
Figure 13:
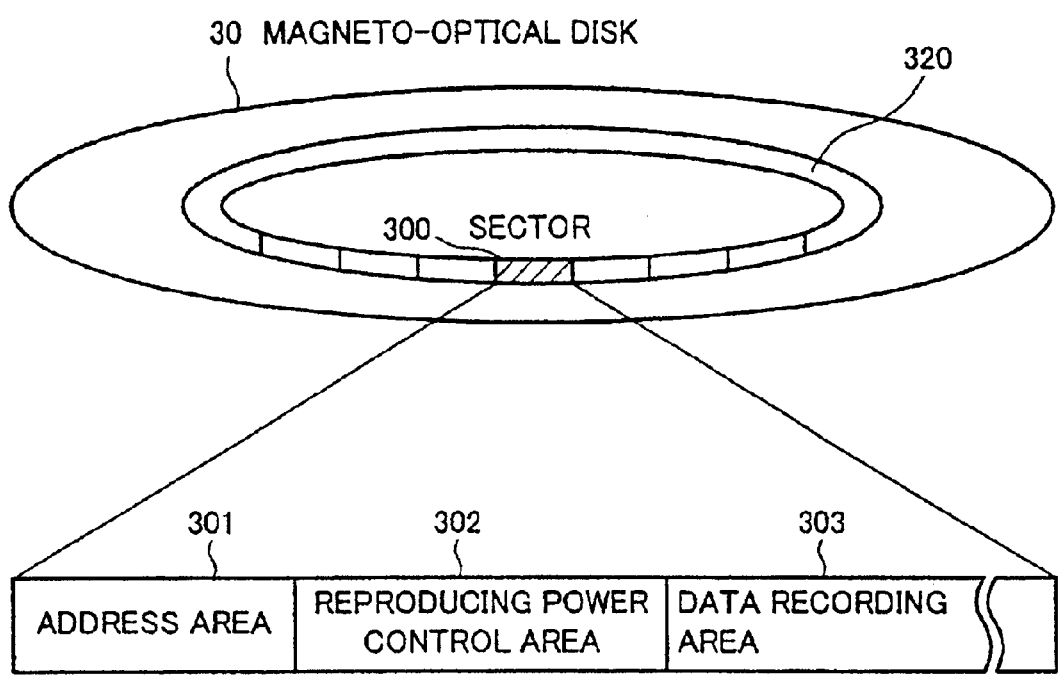
FIG. 13 is a diagram showing a magneto-optical disk reproduced in the magneto-optical disk reproducing device.
Figure 14:
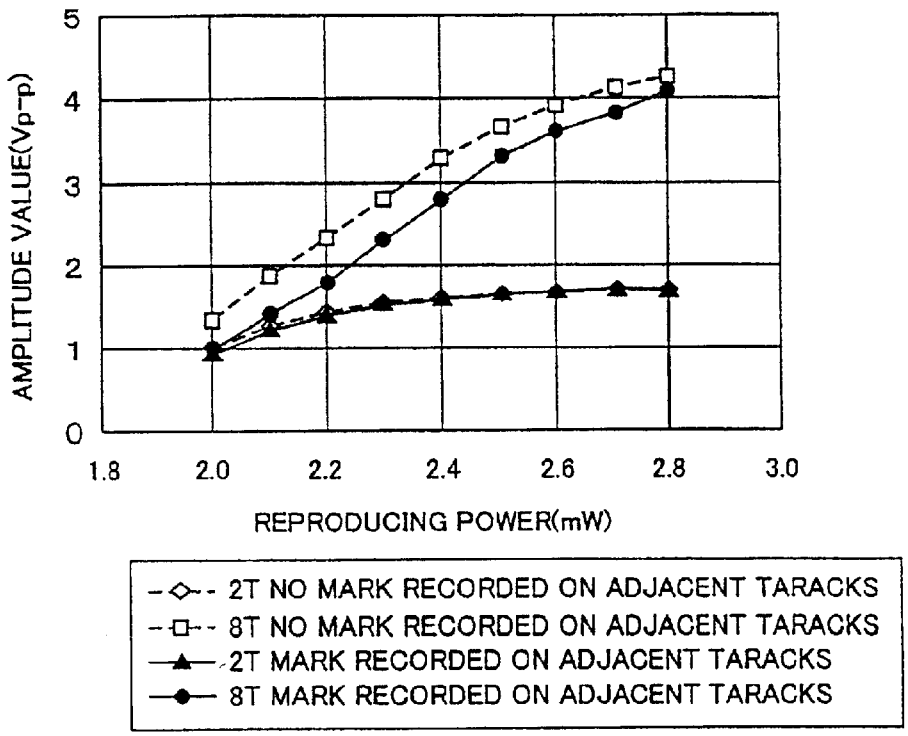
FIG. 14 is a graph showing measurement results of amplitude values regarding a long mark and a short mark relative to a change in reproducing power of the conventional art.
Figure 15:
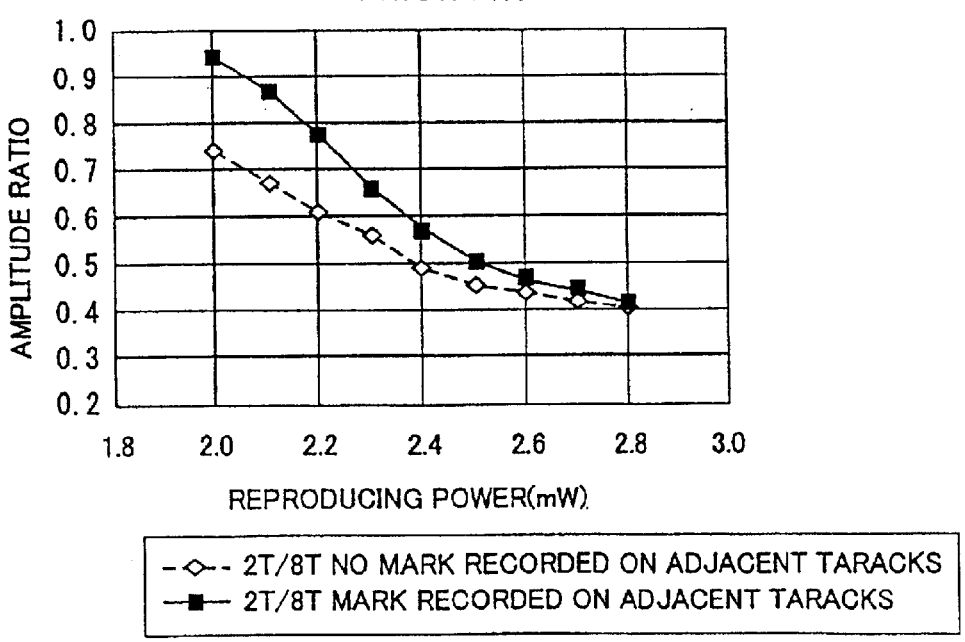
FIG. 15 is a graph showing measurement results of amplitude ratios regarding a long mark and a short mark relative to changes in reproducing power of the conventional art.

FIGS. 11(a) and 11(b) show states of resync patterns recorded in the data recording areas 204 and 207 of the sector on a land and the adjacent grooves. FIG. 11(a) shows a state in which no sector is recorded in groove tracks being adjacent to the sector to be recorded. FIG. 11(b) shows a state in which the sector is recorded in the groove tracks being adjacent to the sector to be recorded.

As shown in FIG. 11(b), when the sector is recorded in the adjacent tracks, a short mark is always recorded in a part adjacent to a part in which a long mark pattern is recorded. As described in the conventional art and Embodiment 1, according to the measurement results of amplitude values of long and short marks relative to a change in reproducing power, a short mark is hardly affected by the presence or absence of a record in the adjacent tracks. Meanwhile, a long mark is considerably affected when a long mark is recorded in the adjacent tracks, and a long mark is not considerably affected when a short mark is recorded in the adjacent tracks. Therefore, in the present embodiment as well, an amplitude value of a long mark and a short mark is hardly changed by the presence or absence of an adjacent record. Consequently, an amplitude value is hardly changed. The following explanation discusses the detail of a reproducing operation performed on the sector, which is recorded as described above.

As shown in FIG. 7, when light emitted from the semiconductor laser 2 reaches the address area 202 of the sector 200 on the magneto-optical disk 20, a sector address is recognized. And then, when emitted light is projected onto the header area 203, light reflected from a short mark (2T) pattern, which is recorded in the header area 203, is converted to a reproducing signal by the photo-diode 3, and the signal is inputted to the amplitude ratio detecting circuit 4 so as to detect an amplitude value of the short mark.

Next, among reproducing signals, which have been read when emitted light is projected to the data recording area 204, a reproducing signal from a resync pattern is inputted to the amplitude ratio detecting circuit 4 and is simultaneously inputted to the reproducing data processing circuit 7. The amplitude ratio detecting circuit 4 extracts an amplitude value of a long mark from a reproducing signal of each resync pattern, accumulates amplitude values, obtains an average value of all the amplitude values of long marks, that are extracted from the resyncs of the sector, and detects the average value as a long-mark amplitude value of the entire sector. And then, the amplitude ratio detecting circuit 4 computes a ratio of the long-mark amplitude value and a short-mark amplitude value detected in the header area 203, and outputs a detected amplitude ratio. As mentioned above, the detected amplitude ratio obtained in this manner is hardly changed by the presence or absence of recording data in groove tracks being adjacent to the sector 200. The detected amplitude ratio is compared with a standard amplitude ratio by the differential amplifier 5, and the laser power control circuit 6 controls a driving current of the semiconductor laser 2 so as to perform feedback in a direction for reducing a difference.

Meanwhile, the reproducing data processing circuit 7 reproduces a reproducing signal from information data inputted alternately with a resync pattern while carrying out re-synchronization by using a reproducing signal of an inputted resync pattern. The reproducing data processing circuit 7 outputs the reproducing signal as reproducing information data having a low error rate and stores it in the buffer memory 8.

As mentioned above, a detected amplitude value is not affected by the presence and absence of a record in the adjacent tracks, so that it is possible to continuously reproduce a data area with high accuracy and optimum reproducing power.

Here, the optical disk is discussed, in which the sectors are all aligned in a radius direction. However, the present invention only needs to have the resync patterns aligned in a radius direction, and the sectors are allowed to be shifted in a radius direction by an interval for inserting resyncs.

Moreover, in the present embodiment, a format for recording short marks in the header area is taken as an example; however, the recording method is not particularly limited. A method for increasing a resync length so as to include short marks, and other methods are also available. The present invention aims to prevent long marks from being adjacent to each other, and a method for recording a short mark is not particularly limited.

Additionally, in Embodiments 1 and 2, two kinds of mark lengths, namely, a long mark and a short mark are used for controlling reproducing power. The present invention aims to prevent long marks from being adjacent to each other, so that it does not matter how many kinds of marks are adopted. Needless to say, the present invention is also effective when only long marks are used for controlling reproducing power.

Further, in the above embodiment, long marks are recorded in the header area or a resync pattern of the data recording area; however, the arrangement is not particularly limited.

As described above, a first magnetic super-resolution magneto-optical recording medium of the present invention, which includes a recording layer and a reproducing layer, is characterized in that long recording marks for controlling reproducing power of a light beam are recorded at different positions between adjacent tracks in a radius direction, each long recording mark larger in diameter than an aperture, which appears in a spot of a light projected onto the reproducing layer.

Like the conventional art, when long marks for controlling reproducing power of a light beam are adjacent to each other (formed at the same position between the adjacent tracks in a radius direction), an external magnetic field is varied on the reproducing layer of the magneto-optical disk during reproduction of information, so that an aperture diameter is likely to change. Therefore, when an amplitude ratio is determined so as to obtain an optimum reproducing signal, with reference to a state in which no recording mark is recorded in tracks adjacent to a track being reproduced, in a state in which a recording mark is recorded in the adjacent tracks, even if an amplitude ratio is set at the standard amplitude ratio determined in accordance with the above reference, reproducing power is shifted from the actual optimum reproducing power. Hence, as described above, the present invention has a construction in which recording marks for controlling reproducing power are formed at different positions between the adjacent tracks in a radius direction, so that it is possible to continuously reproduce a data recording area with high accuracy and optimum reproducing power without being affected by the adjacent tracks.

With the construction of the first magneto-optical recording medium, a second magneto-optical recording medium of the present invention is characterized in that the recording marks are recorded in a header recording area.

According to the above construction, it is possible to continuously reproduce the data recording area with high accuracy and optimum reproducing power without being affected by the adjacent tracks.

A third magneto-optical recording medium of the present invention is characterized in that the recording marks are recorded in a resync pattern of the data recording area.

In the same manner as the first magneto-optical recording medium, it is possible to continuously reproduce the data recording area with high accuracy and optimum reproducing power without being affected by the adjacent tracks. Further, the recording marks are included in the resync pattern, resulting in more efficient use of the recording medium.

A first magneto-optical recording and reproducing device of the present invention, which carries out recording and reproducing for a magnetic super-resolution magneto-optical recording medium including a recording layer and a reproducing layer, is characterized by a recording means which records long recording marks for controlling reproducing power of a light beam at different positions between adjacent tracks in a radius direction, each long recording mark being longer than a diameter of an aperture, which appears in a spot of a light beam projected onto the reproducing layer.

According to the above construction, the long recording marks for controlling reproducing power are recorded at different positions between the adjacent tracks in a radius direction, so that it is possible to continuously reproduce a data recording area with high accuracy and optimum reproducing power without being affected by the adjacent tracks.

With the construction of the first magneto-optical recording device, a second magneto-optical recording and reproducing device of the present invention is characterized in that the recording means includes a means for generating different recording mark patterns between adjacent tracks, and a means for recording the generated recording mark patterns in specific areas of the magneto-optical recording medium such that the specific areas of the adjacent tracks are aligned in a radius direction.

According to this arrangement, the recording positions of the recording marks differ between tracks adjacent to each other in a radius direction, so that only a simple construction makes it possible to continuously reproduce the data recording area with high accuracy and optimum reproducing power.

With the construction of the first magneto-optical recording medium, a third magneto-optical recording and reproducing device of the present invention, which is a magneto-optical recording and reproducing device for recording both a land track and a groove track of the magneto-optical recording medium, is characterized in that the recording means includes a means for generating a recording mark pattern for a land track and a recording mark pattern for a groove track, and a means for recording a recording mark pattern corresponding to a track to be recorded such that specific areas of the magneto-optical recording medium are aligned between the adjacent tracks in a radius direction.

According to this arrangement, only a simple construction makes it possible to continuously reproduce information recorded in the data recording areas of a land track and a groove track with high accuracy and optimum reproducing power such that the recording marks of tracks, which are adjacent to each other in a radius direction, are positively disposed at different positions.

With the construction of the second or third magneto-optical recording and reproducing device, a fourth magneto-optical recording and reproducing device of the present invention is characterized in that the specific areas are resync patterns of the header areas or the data recording areas.

According to this arrangement, the specific area is disposed in a resync pattern of the header area or the data recording area, so that in the same manner as the first magneto-optical recording and reproducing device, it is possible to continuously reproduce the data recording area with high accuracy and optimum reproducing power without being affected by the adjacent tracks. Further, when a recording marks are included in resync patterns, it is possible to realize more efficient use of the recording medium.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic super-resolution magneto-optical recording medium comprising:

a recording layer;

a reproducing layer;

wherein recording marks for controlling reproducing power of a light beam are recorded in a header area of a sector constituting said magneto-optical recording medium;

wherein, in the case where a header area in each of adjacent tracks are recorded in the adjacent tracks in proximity to one another, long recording marks for controlling reproducing power of a light beam in each header area of the adjacent tracks are arranged so that said long recording marks in the header area in one of the adjacent tracks is recorded at a different position in a radius direction than said long recording marks in the header area of the other of the adjacent tracks, each of said long recording marks being larger in diameter than an aperture formed on said reproducing layer by projecting thereon the light beam; and wherein only a pattern for setting reproducing phase, that adjusts a phase of a reproducing clock, and short recording marks for controlling reproducing power, each of said short recording marks being smaller in diameter than the aperture, are recorded in a header area of the sector.

2. A magnetic super-resolution magneto-optical recording medium comprising:

a recording layer;

a reproducing layer;

wherein recording marks for controlling reproducing power of a light beam are recorded in a header area of a sector constituting said magneto-optical recording medium;

wherein, in the case where a header area in each of adjacent tracks are recorded in the adjacent tracks in proximity to one another, long recording marks for controlling reproducing power of a light beam in each header area of the adjacent tracks are arranged so that said long recording marks in the header area in one of the adjacent tracks is recorded at a different position in a radius direction than said long recording marks in the header area of the other of the adjacent tracks, each of said long recording marks being larger in diameter than an aperture formed on said reproducing layer by projecting thereon the light beam; and wherein recording can be carried out in both land tracks and groove tracks.

3. A magneto-optical recording and reproducing device, which carries out recording and reproducing for a magneto-optical recording medium including a recording layer and a reproducing layer, comprising:

recording means which records recording marks for controlling reproducing power of a light beam;

wherein said recording means controls recording of long recording marks for controlling reproducing power of a light beam such that, in the case where said recording marks for controlling reproducing power of a light beam are recorded in adjacent tracks in proximity to one another, said long recording marks in each of the adjacent tracks are arranged so that said long recording marks in one of the adjacent tracks is recorded at a different position in a radius direction than said long recording marks in the other of the adjacent tracks, each of said long recording marks being larger in diameter than an aperture formed on said reproducing layer by projecting thereon the light beam; and wherein recording of said recording marks is carried out both for land tracks and groove tracks of said magneto-optical recording medium, and wherein said magneto-optical recording and reproducing device further comprises means for generating a recording mark pattern for land tracks and a recording mark pattern for groove tracks.

4. A magnetic super-resolution magneto-optical recording medium comprising:

a recording layer;

a reproducing layer;

wherein recording marks for controlling reproducing power of a light beam are recorded in a header area of a sector constituting said magneto-optical recording medium;

wherein, in the case where a header area in each of adjacent tracks are recorded in the adjacent tracks in proximity to one another, long recording marks for controlling reproducing power of a light beam in each header area of the adjacent tracks are arranged so that said long recording marks in the header area in one of the adjacent tracks is recorded at a different position in a radius direction than said long recording marks in the header area of the other of the adjacent tracks, each of said long recording marks being larger in diameter than an aperture formed on said reproducing layer by projecting thereon the light beam; and wherein recording marks for controlling reproducing power of a light beam are recorded in both land tracks and groove tracks.

5. The magneto-optical recording and reproducing device as defined in claim 3, wherein said pattern generating means is header pattern generating means.

6. The magneto-optical recording and reproducing device as defined in claim 3, wherein said pattern generating means is resync pattern generating means.

7. The magneto-optical recording and reproducing device as defined in claim 3, wherein said recording means records said recording marks, which control reproducing power of a light beam, in specific areas formed so as to be aligned between adjacent tracks in a radius direction.

8. The magneto-optical recording and reproducing device as defined in claim 3, wherein said recording means records a recording mark pattern corresponding to a track to be recorded, in said specific areas, such that said specific areas of said magneto-optical recording medium are aligned between adjacent tracks in a radius direction.

9. The magneto-optical recording and reproducing device as defined in claim 3, wherein each said specific area is a header area of a sector constituting said magneto-optical recording medium.

10. The magneto-optical recording and reproducing device as defined in claim 3, wherein each said specific area is a resync pattern in a data recording area of a sector constituting said magneto-optical recording medium.

* * * * *